May 21, 1968     T. SCHWARZ     3,384,335
MOLD FOR MAKING SYNTHETIC RESIN FOAM PLATES
Filed April 28, 1965     2 Sheets-Sheet 1

INVENTOR
THEODOR SCHWARZ
BY Kurt Kelman
AGENT

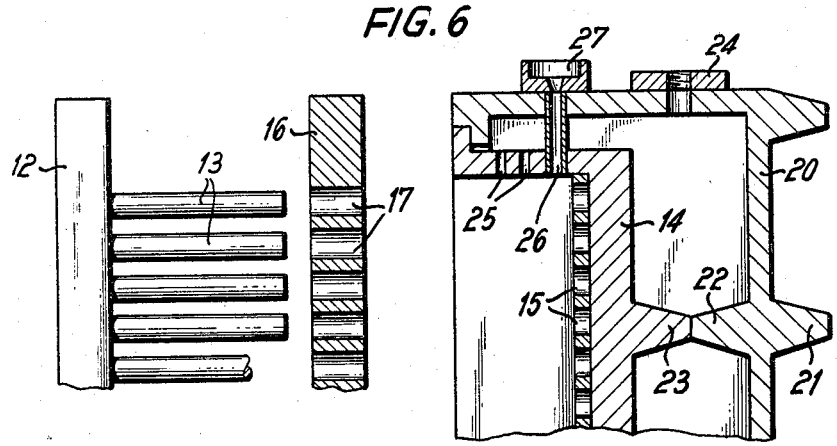
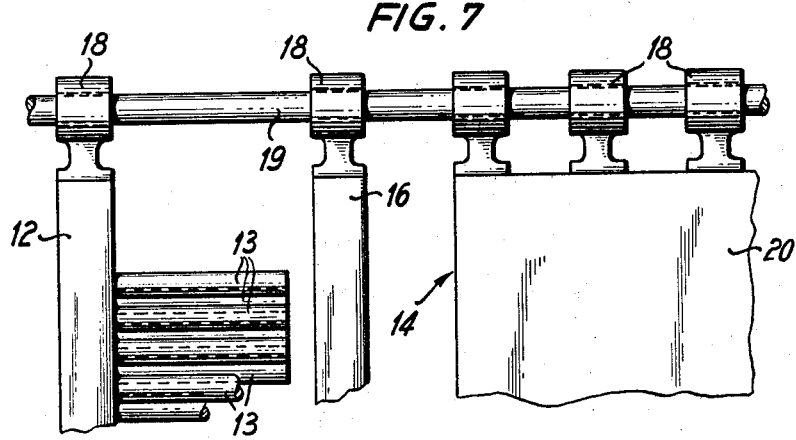

United States Patent Office 3,384,335
Patented May 21, 1968

3,384,335
MOLD FOR MAKING SYNTHETIC RESIN FOAM PLATES
Theodor Schwarz, Espenweg 22,
Hagen-Vorhalle, Germany
Filed Apr. 28, 1965, Ser. No. 451,500
Claims priority, application Germany, Mar. 31, 1965,
Sch 36,814
6 Claims. (Cl. 249—67)

ABSTRACT OF THE DISCLOSURE

A mold useful for the manufacture of plastic foam plates, comprising a first mold part, a second mold part and an ejection plate therebetween. The second mold part has a recess wherein the plates are molded, and steam is let into this recess to expand the plastic therein.

Background and summary of the invention

The present invention relates to improvements in a mold useful for the manufacture of polystyrene foam plates.

It is a primary object of this invention to produce polystyrene and other synthetic resin foam plates of substantial size and thickness with bores extending inwardly from at least one surface thereof and distributed uniformly thereover. The bores may have any desired cross section and/or size, and may be distributed in any desired arrangement to obtain a desired plate surface. The large-size plates or slabs may be cut into thinner sheets so that filler elements for a variety of purposes may be manufactured in a single mold whose size may be chosen in accordance with the desired surface area of the plates or sheets.

The resultant synthetic resin filler elements may then simply be placed into a frame and veneer, plastic sheet, cardboard, metal sheet or other facings may be readily mounted on the apertured surface of the filler element. The end product is an internally honeycombed plate of a desired thickness with smooth edges, which may be reinforced and which may have rims extending along some edges.

In accordance with the invention, a mold useful for the manufacture of apertured polystyrene foam plates comprises a first plate-like mold part, a second mold part mounted opposite the plate-like mold part, an ejection plate mounted between the plate-like mold part and the second mold part, and guide means mounting the plate-like mold part, the second mold part and the ejection plate for relative movement in respect of each other, the mold being closed when the first and second mold parts are moved together, with the ejection plate being therebetween.

A plurality of pins extend from the plate-like mold part, the transverse cross section of the pins corresponding to the transverse cross section of the apertures desired in the plates to be molded and the distribution of the pins corresponding to the desired distribution of the apertures in the plates.

The second mold part has a bottom and side walls defining a recess having a depth corresponding to the desired thickness of the plates to be molded, and the ejection plate has the same size as the plate-like mold part and defines bores receiving the pins of the plate-like mold part. The guide means may include a guide rail and the mold parts and ejection plate may have lugs glidingly engaging the rail.

Hydraulic, pneumatic or mechanical means may be used to move the mold parts and ejection plate relatively to one another.

In one embodiment of the present invention, the length of the pins is such that the ends of the pins are spaced from the bottom of the second mold part when the mold parts are moved together, i.e. when the mold is closed. In this manner, a synthetic resin foam plate may be produced, which has one large apertured surface while the surface of the plate opposite thereto is solid, i.e. forms a nonapertured wall closing off the bores extending into the plate from the one surface.

For filling the recess in the mold with molding material, such as preferably prefoamed polystyrene beads, when the mold is closed, inlet means is arranged in the wall of the second mold part. If desired, the molding material may be delivered to the inlet means pneumatically and a closure piston may close the inlet means automatically when the molding material fills the recess.

As is known, the molding material is foamed in the mold by means of steam introduced into the mold. For this purpose, a jacket surrounds the second mold part and is adapted to receive a supply of steam connected thereto. The jacket and the recess in the second mold part are in communication, for instance by a plurality of jet openings in the second mold part wall, to permit steam from the jacket to enter the recess.

Synthetic resin foam plates produced according to this invention in such molds preferably have a surface area of the order of at least about one square meter and a thickness of at least about 100 mm., with a plurality of bores extending inwardly from at least one surface thereof and being arranged in rows, the bores of one row being staggered in respect of the bores of an adjacent row.

Plates of this type with one solid surface wall are particularly useful for sound or heat insulation. An internally honeycombed synthetic resin foam body of this type is very advantageous for heat insulation and the honeycombed structure provides a multiplicity of membranes improving the sound insulation characteristics thereof. By varying the thickness of the plates and the length of their bores, their heat insulation properties may be very accurately controlled and, within certain limits, these may also determine their sound insulation characteristics.

For some uses, it is advantageous to provide a rim along at least two edges of the plate. Such rims may be used, for instance, for interconnecting a number of thin sheets cut from the plate with a frame, molding and the like.

Brief description of drawing

The above and other objects, advantages and features of the present invention will become more apparent in the following detailed description of certain preferred embodiments thereof, taken in conjunction with the accompanying drawing wherein

FIG. 6 is a cross section showing a part of the mold of the invention, with the mold parts moved apart; and FIG. 7 is a top view of FIG. 6.

Detailed description

Figure 1:
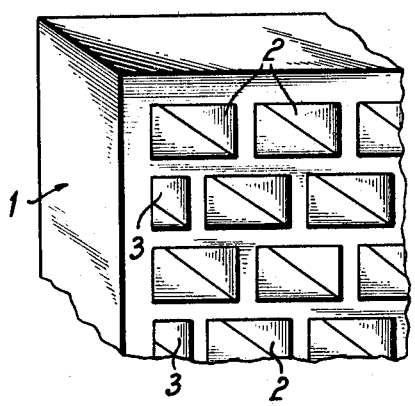
FIG. 1 is perspective view showing a part of an apertured synthetic foam plate according to this invention.

Referring now to the drawing, and more particularly to FIG. 1, there is shown a corner of a polystyrene foam plate 1 with rows of bores 2 of rectangular cross section and passing through the plate from one surface to the surface opposite thereto. As illustrated, the bores 2 of one row are staggered in respect of the bores of an adjacent row, and the bores are distributed uniformly over the entire length and width of the plate. The bores are staggered in respect of each other by one half the width of the bores so that alternate rows of bores have end bores 3 of half the size as the other bores.

Figure 2:
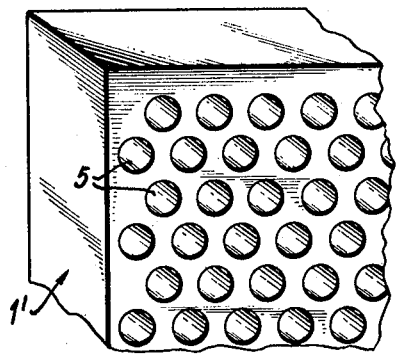
FIGS. 2 and 3 are like views of modified synthetic resin foam plates.
Figure 4:
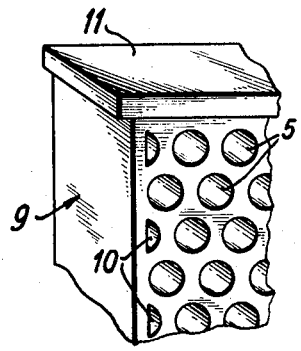
FIG. 4 shows still another embodiment of a synthetic resin foam plate in a like view.

The modification shown in FIG. 2 is substantially the same as that of FIG. 1, except that the bores 5 of plate 1' are of circular cross section. In this modification, the half-sized end bores in every other row are omitted although, as shown in the embodiment of FIG. 4, such end bores 10 may be provided, if desired.

Figure 3:
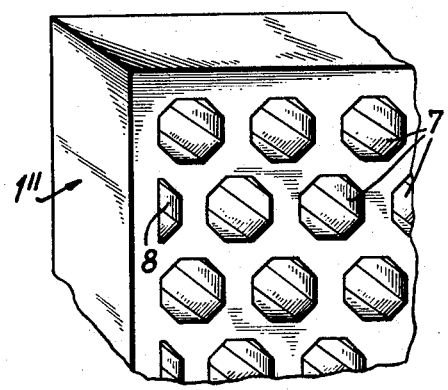

In the modification of FIG. 3, the plate 1" has bores 7 of hexagonal cross section, with half-sized bores 8 in alternate rows. Plate 9 of FIG. 4 is like the plate of FIG. 2, except that one of the plate edges is shown to have a rim 11, the opposite edge (not shown) usually being provided with a like rim.

Figure 5:
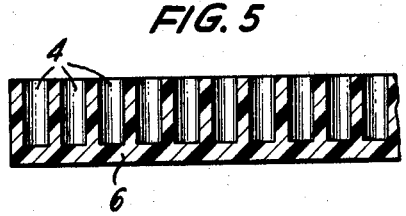
FIG. 5 is a vertical cross section of a synthetic resin foam plate with one apertured and one solid surface.

For some purposes, it is desirable to provide a plate with one solid, i.e. non-apertured, surface and such a plate 6 is shown in FIG. 5. This plate has bores 4 extending from one surface but not passing through the entire plate, the opposite surface of the plate being formed by a solid wall which constitutes a membrane closing off the bores at one end. The thickness of this membrane may be chosen at will, depending on the end use of the plate.

FIGS. 5 and 6, wherein like reference numerals designate like parts, illustrate a useful embodiment of the mold of this invention. As shown, a first plate-like mold part 12 has a plurality of pins 13 extending therefrom, the cross section and the distribution of the pins being chosen in accordance with those of the bores desired in the molded plate, such as exemplified by FIGS. 1 to 5. A second mold part 14 is mounted opposite the part 12 and has a bottom and side walls defining a recess. The depth of the rececss corresponds to the desired thickness of the plates to be molded therein. In the illustrated embodiment of the mold, the bottom of the second mold part 14 has an apertured lining 15 for receiving the ends of pins 13 when the mold parts are moved together to close the mold. When this lining is removed, the length of the pins is such that their ends will be spaced from the bottom of the second mold part in the closed position of the mold. In this modification, the mold will produce the type of plate shown in FIG. 5.

An ejection plate 16 of relatively small thickness is mounted between mold parts 12 and 14, the ejection plate having the same size as mold part 12 and defining bores 17 receiving pins 13 when the mold parts are moved together.

As shown in FIG. 7, each of the mold parts 12 and 14, as well as ejection plate 16 has lugs 18 glidably engaging a guide rail 19 on which these members are mounted for relative movement in respect, and independently, of each other. The mold parts 12 and 14 are moved apart for opening the mold and are moved together for closing the mold, the ejection plate 16 being movable in either direction and independently of the movement of the mold parts when the mold ports are apart.

This independent movement of the ejection plate makes it possible carefully to detach the molded plate from the mold when the mold is opened and then to take the molded plate from the ejection plate.

The lugs 18 have bearing sleeves glidingly engaging the guide rail 19, which makes the movement of the three mold parts very easy. A plurality of such guide means are distributed over the circumference of the mold to hold the mold parts securely in position for movement in relation to each other.

The above-described mold operates as follows:

Mold parts 12 and 14 are moved together and the mold is closed, whereupon preferable prefoamed polystyrene beads or other foamable plastic material is introduced into the mold through inlet 26 connected to a supply funnel 27.

After the mold recess has been filled with the foamable synthetic resin, it is subjected to water vapor at a pressure of about one to 1.5 atmospheres, depending on the specific gravity of the foam. For this purpose, jacket 20 surrounds the mold part 14, reinforcing ribs 21, 22 and 23 being provided on the jacket and mold part walls, if desired. An inlet means 24 for the steam is connected to a source of steam (not shown) and steam enters the mold from the jacket through jet openings 25.

I claim:
1. A mold useful for the manufacture of apertured polystyrene foam plates, comprising
   (a) a first plate-shaped mold part having a flat molding surface,
      (1) a plurality of pins extending from the molding surface of the plate-shaped mold part, the transverse cross-section of the pins corresponding to the transverse cross-section of the apertures desired in the plates to be molded and the distribution of the pins corresponding to the desired distribution of the apertures in the plates;
   (b) a second mold part mounted opposite the flat molding surface of the plate-shaped mold part,
      (2) the second mold part having a flat bottom and side walls defining a recess having a depth corresponding to the desired thickness of the plates to be molded;
   (c) an ejection plate mounted between the plate-shaped mold part and the second mold part,
      (3) the ejection plate having the same size as the plate-shaped mold part and defining bores receiving the pins of the plate-shaped mold part;
   (d) guide means mounting the plate-shaped mold part, the second mold part and the ejection plate for relative movement in respect of each other; and
   (e) inlet means for supplying steam to said recess.

2. The mold of claim 1, wherein the length of said pins is such that the end of the pins are spaced from the bottom of the second mold part when said mold parts are moved together.

3. The mold of claim 1, wherein the bottom of the second mold part has an apertured lining, the apertures of the lining receiving the ends of said pins when said mold parts are moved together.

4. The mold of claim 1, wherein said guide means includes a guide rail and said mold parts and ejection plate have lugs glidably engaging the guide rail.

5. The mold of claim 1, further comprising inlet means in the second mold part for filling its recess with molding material.

6. The mold of claim 1, further comprising a jacket surrounding the second mold part, inlet means in said jacket adapted to receive a supply of steam connected thereto, and said first-named steam supplying inlet means being a passage between the jacket and the recess in the second mold part to permit steam from the jacket to enter the recess.

References Cited

UNITED STATES PATENTS

| 2,302,342 | 11/1942 | Nast. | |
| 2,377,393 | 6/1945 | Wiley | 18—30 X |
| 2,416,680 | 3/1947 | Curtis | 18—42 X |
| 2,752,635 | 7/1956 | Miller | 249—176 X |
| 2,850,766 | 9/1958 | Press et al. | 249—68 X |
| 2,901,773 | 9/1959 | Talalay | 249—176 X |
| 3,059,305 | 10/1962 | Brozdowicz. | |
| 3,092,446 | 6/1963 | Rex et al. | 18—30 X |
| 3,158,902 | 12/1964 | McPherson | 18—16 |
| 3,224,037 | 12/1965 | Robbins et al. | 18—5 |
| 3,224,040 | 12/1965 | Bridges et al. | |

J. HOWARD FLINT, JR., *Primary Examiner.*